(12) United States Patent
Hasegawa et al.

(10) Patent No.: US 7,426,788 B2
(45) Date of Patent: Sep. 23, 2008

(54) TILT ANGLE SENSOR LAYOUT STRUCTURE FOR A VEHICLE, AND VEHICLE INCORPORATING SAME

(75) Inventors: Toru Hasegawa, Saitama (JP); Seiji Hanafusa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/511,556

(22) Filed: Aug. 29, 2006

(65) Prior Publication Data

US 2007/0051001 A1 Mar. 8, 2007

(30) Foreign Application Priority Data

Sep. 2, 2005 (JP) ............................. 2005-255029

(51) Int. Cl.
*G01C 9/12* (2006.01)
*G05D 1/00* (2006.01)
(52) U.S. Cl. ...................... 33/366.24; 33/333; 180/282
(58) Field of Classification Search ............ 333/366.24, 333/333, 366.11; 180/282
See application file for complete search history.

(56) References Cited

U.S. PATENT DOCUMENTS 1,413,416 A * 4/1922 Meldrum ..................... 33/333
4,703,315 A * 10/1987 Bein et al. ................ 33/366.24
6,499,220 B2 * 12/2002 Katsuki et al. ........... 33/366.24
7,017,701 B2 * 3/2006 Flynn et al. .............. 33/366.24
2002/0027037 A1 3/2002 Takao et al.
2004/0050609 A1 3/2004 Kenichi et al.
2005/0161274 A1 7/2005 Yuichiro

FOREIGN PATENT DOCUMENTS

JP 2005-178420 7/2005

\* cited by examiner

*Primary Examiner*—Christopher W Fulton
(74) *Attorney, Agent, or Firm*—Carrier, Blackman & Associates, P.C.; William D. Blackman; Joseph P. Carrier (57) ABSTRACT

In a saddle-type vehicle having at least three wheels, a tilt angle sensor layout structure is provided which ensures that a tilt angle sensor is minimally influenced by a centrifugal force or vibration of a vehicle body while the vehicle is turned, and the tilt angle sensor is protected against flying stones and the like. The vehicle includes an engine, and a fuel injection system for supplying fuel from a fuel tank to the engine, with a steering mechanism including a steering shaft provided on the front side of the vehicle body. A plurality of frame members constituting the vehicle body frame supporting the steering mechanism are connected in the shape of a frame loop in vehicle side view, and the tilt angle sensor for detecting the tilt angle in the left-right direction of the vehicle body is attached to the loop-shaped portion of the vehicle body frame.

20 Claims, 8 Drawing Sheets

PRIOR ART

FIG. 9

PRIOR ART

TILT ANGLE SENSOR LAYOUT STRUCTURE FOR A VEHICLE, AND VEHICLE INCORPORATING SAME

CROSS-REFERENCE TO RELATED APPLICATIONS

The present invention claims priority under 35 USC 119 based on Japanese patent application No. 2005-255029, filed on Sep. 2, 2005. The subject matter of these priority documents is incorporated by reference herein.

BACKGROUND OF THE INVENTION

1. Field of the Invention

The present invention relates to vehicle safety accessories, and particularly to a tilt angle sensor layout structure for a vehicle, and a vehicle incorporating such a tilt angle sensor.

2. Description of the Background Art

It is well known that off-road recreational vehicles such as, for example, all-terrain vehicles (ATVs) may drive over all different types of terrain, and often will be driven up steep hills or on terrain that is angled at a grade. It has been known to use tilt angle sensors in ATVs as a safety feature. A tilt angle sensor is used to detect, for example, a tilt angle in the left-right direction of a vehicle. When the vehicle is inclined to such an extent that the tilt angle exceeds a predetermined angle, the engine is forcibly stopped. This can be achieved, for example, by stopping the ignition power supply to the engine, or alternatively, by stopping the fuel supply to the engine.

It is known to provide a layout structure for such a tilt angle sensor in a vehicle in which a rollover sensor is also provided, in the vicinity of a steering shaft and on the front side of a fuel tank. Such a layout structure is disclosed in Japanese Patent Laid-open No. 2005-178420.

Figure 8:
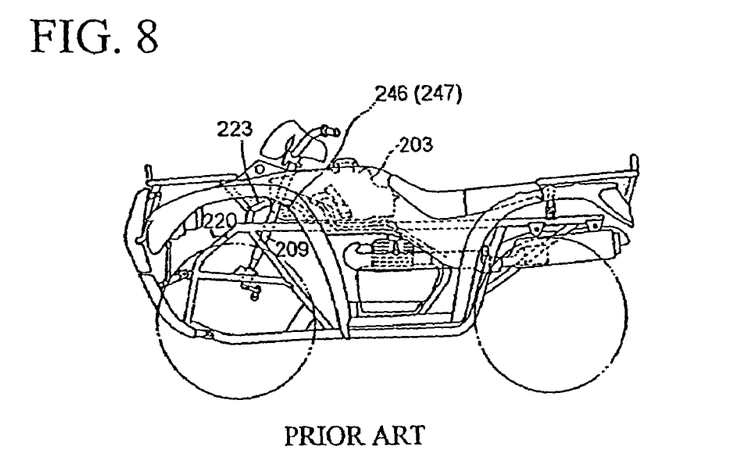
FIG. 8 is a reproduction of a drawing from an earlier publication, and is a side view of a vehicle showing a prior art tilt angle sensor layout structure.
Figure 9:
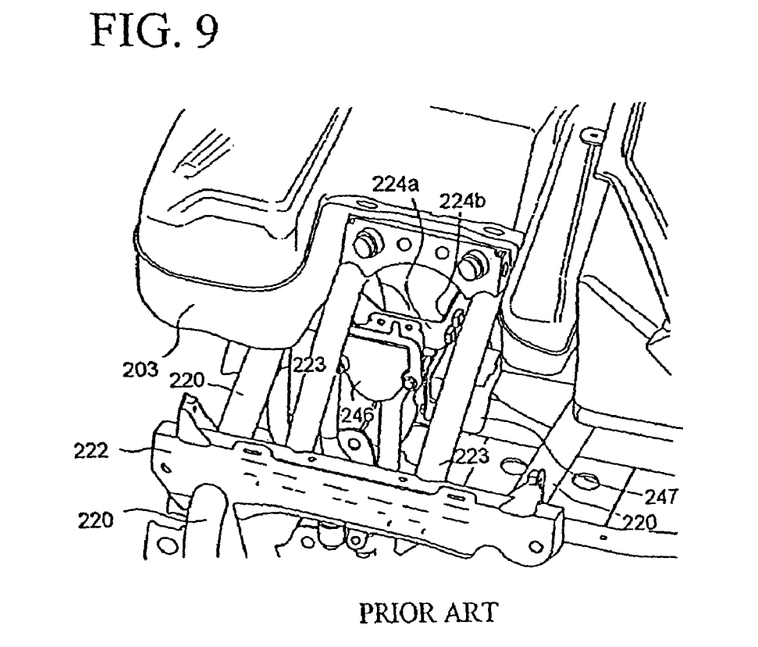
FIG. 9 is a reproduction of a drawing from an earlier publication, and is a front perspective view of the prior art tilt angle sensor layout structure of the vehicle of FIG. 8.

FIGS. 8 and 9 are reproductions of FIGS. 1 and 7, respectively, of Japanese Patent Laid-open No. 2005-178420, in which the reference numbers have been modified from those in the original document. In FIG. 8, it is shown that a front portion of a fuel tank 203 is provided with a recessed portion that permits the steering shaft 209 to pass therethrough, and rollover sensors 246 and 247 are disposed in the recessed portion. In addition, as shown in FIG. 9, Japanese Patent Laid-open No. 2005-178420 discloses that a bar 222 is bridgingly provided between left and right main frames 220, 220, two sub frames 223, 223 are extended from the bar 222 toward the vehicle rear side, a stay 224a, 224b is bridgingly provided between the sub frames 223, 223, and the rollover sensors 246 and 247 are attached to the stay 224a, 224b.

When the two rollover sensors 246 and 247 are disposed in the recessed portion provided at the front portion of the fuel tank 203, it is necessary, for avoiding interference with the rollover sensors 246 and 247, to form the recessed portion in a large size, or to space the recessed portion away from the rollover sensors 246 and 247. These requirements influence the shape and layout of the fuel tank 203.

On the other hand, a center of turning of the vehicle is present in the vicinity of the steering shaft 209. Therefore, where the rollover sensors 246 and 247 are disposed at such a center of turning, it is possible to reduce the possibility of the sensors being influenced by centrifugal force at the time of turning of the vehicle; accordingly, it is desired to lay out the rollover sensors 246 and 247 in the vicinity of the center of turning of the vehicle, without influencing the shapes and layout of such component parts as the fuel tank 203.

Furthermore, it is desirable to adopt a layout structure in which the stay 224a, 224b that supports the rollover sensors 246 and 247 is attached to a higher-rigidity portion of a vehicle body frame, so as to minimize an influence of vibrations of the vehicle body, and in which the rollover sensors 246 and 247 can be protected against flying stones and the like coming from the vehicle body front side.

It is an object of the present invention to provide a tilt angle sensor layout structure such that the tilt angle sensor is less liable to be influenced by a centrifugal force at the time of turning of the vehicle or by vibrations of the vehicle body.

It is another object of the present invention to provide a tilt angle sensor layout structure configured such that it is unnecessary to change the shapes and layout of other component parts provided on the vehicle body.

It is still another object of the present invention to provide a tilt angle sensor layout structure in which the tilt angle sensor can be protected against flying stones and the like coming from the front end of the vehicle body.

SUMMARY

The present invention provides an improved layout structure for a tilt angle sensor in a vehicle, and also provides a vehicle incorporating the improved layout structure.

A first aspect of the present invention is characterized in a tilt angle sensor layout structure for a vehicle having at least three wheels. The vehicle includes a vehicle body, a vehicle body frame on which the vehicle body is supported, an engine, a fuel injection system for supplying a fuel from a fuel tank into the engine, with a steering mechanism including a steering handle and a steering shaft being provided at a front portion of the vehicle body. A tilt angle sensor, adapted for detecting a tilt angle of the vehicle in a left-right direction of the vehicle body, is attached to a vehicle body frame. That is, a plurality of frame members, constituting a portion of the vehicle body frame supporting the steering mechanism, are connected in the shape of a frame loop in side view, and the tilt angle sensor is disposed on the frame loop.

At the time of turning of the vehicle, the vehicle body is turned to the left or the right about a vertical axis. The vertical axis passes through a position which is at the center in the vehicle width direction, and which corresponds to the front wheel(s) in the longitudinal front-rear direction of the vehicle. Since the steering shaft of the steering mechanism is located at the position of such a center of turning, placement of the tilt angle sensor in the vicinity of the steering mechanism ensures that the displacement of the tilt angle sensor at the time of turning of the vehicle will be minimized, and that a centrifugal force acting on the tilt angle sensor will be minimized.

When the tilt angle sensor is disposed on the frame loop composed of the plurality of frame members supporting the steering mechanism, the degree of freedom, in selecting the position of the tilt angle sensor on the loop without changing the shapes or layout of component parts provided on the vehicle body, is increased.

Because the plurality of frame members are laid out so as to form a frame loop in side view, the rigidity of the vehicle frame is enhanced. By positioning the tilt angle sensor at a rear portion of any one of the plurality of frame members forming the loop, a flying stone or the like, coming from the vehicle front side, is blocked by the frame member and is prevented from colliding with the tilt angle sensor.

A second aspect of the invention is uniquely defined in that the fuel injection system includes a relay for controlling fuel supply to the engine on the basis of a signal from the tilt angle sensor, and the relay is attached to the vehicle body frame in a location proximate the tilt angle sensor.

Since the tilt angle sensor and the relay are disposed close to each other, a wiring for connection between the tilt angle sensor and the relay is shortened.

According to the first aspect of the invention, the plurality of frame members constituting the vehicle body frame supporting the steering mechanism are connected in the shape of a frame loop in side view, and the tilt angle sensor is laid out on the frame loop. Therefore, the tilt angle sensor can be laid out in the vicinity of the center of turning of the vehicle, and there is no need for changing the shapes or layout of component parts provided on the vehicle body. In addition, the tilt angle sensor can be disposed at a high rigidity portion of the vehicle body frame, and the influence of vibrations of the vehicle body on the tilt angle sensor is reduced. Furthermore, the tilt angle sensor is protected by the loop-shaped portion of the vehicle body frame.

According to the second aspect of the invention, the fuel injection system includes a relay for controlling the fuel supply to the engine on the basis of the signal from the tilt angle sensor, and the relay is attached to the vehicle body frame in a location proximate the tilt angle sensor. Therefore, the tilt angle sensor and the relay are disposed close to each other, so that the wiring for connection between the tilt angle sensor and the relay is made shorter, and noise is reduced accordingly.

Modes for carrying out the present invention are explained below by reference to an embodiment of the present invention shown in the attached drawings. The above-mentioned object, other objects, characteristics and advantages of the present invention will become apparent from the detailed description of the embodiments of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the disclosure, the drawings are to be looked at according to the posture of symbols, and references to right, left, front and rear are considered from the vantage point of a vehicle operator seated on the vehicle.

Figure 1:
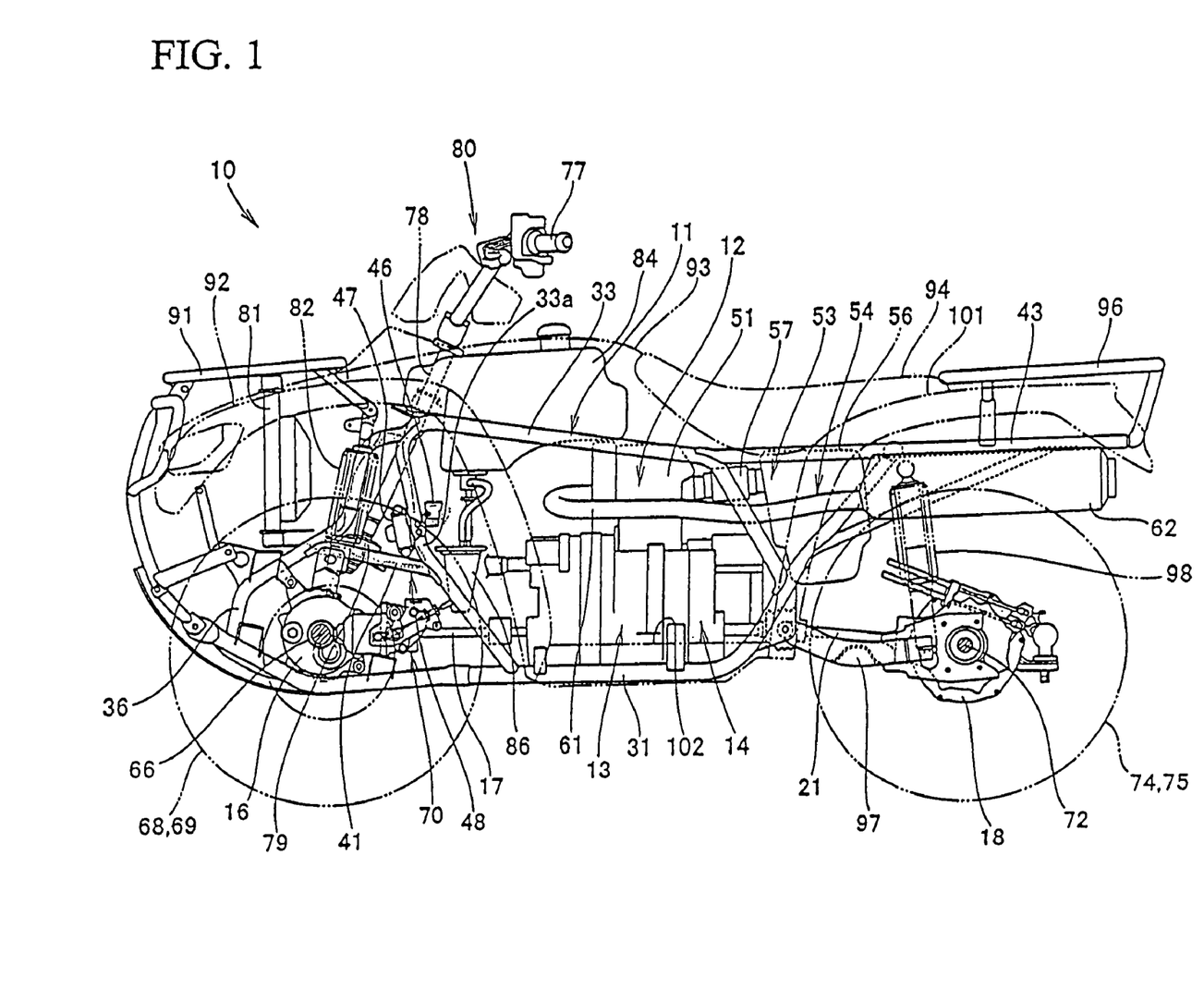
FIG. 1 is a side view of an all-terrain vehicle, showing the vehicle body frame in which a tilt angle sensor layout structure is adopted according to a selected illustrative embodiment of the present invention.

FIG. 1 is a side plan view of a vehicle 10 which includes a tilt angle sensor layout structure according to an illustrative embodiment of the present invention. The vehicle 10 depicted in FIG. 1 is a four-wheel-drive type all-terrain vehicle (ATV) in which a power unit 14, including a longitudinally set type engine 12 and a transmission 13, is disposed substantially at the center of a vehicle body frame 11. A front final drive assembly 16, disposed on the front side of the power unit 14, and the transmission 13 are connected to each other through a front propeller shaft 17. Similarly, a rear final drive assembly 18, disposed on the rear side of the power unit 14, and the transmission 13 are connected to each other through a rear propeller shaft 21.

The vehicle body frame 11 includes a left-right pair of lower frames 31, 32 (only symbol 31 on the viewer's side is shown) supporting a lower portion of the power unit 14. The vehicle body frame 11 also includes a roughly angular U-shaped left-right pair of upper frames 33, 34 (only symbol 33 on the viewer's side is shown) attached to upper portions of the lower frames 31, 32 so as to surround the power unit 14 in side view. The vehicle body frame 11 also includes a left-right pair of front frames 36, 37 (only symbol 36 on the viewer's side is shown) for connection between front upper portions of the upper frames 33, 34 and front end portions of the lower frames 31, 32. The vehicle body frame 11 also includes a left-right pair of front connection frames 41, 42 (only symbol 41 is shown) for connection between the front frames 36, 37 and the upper frames 33, 34. The vehicle body frame 11 further includes a left-right pair of rear upper frames 43, 44 (only symbol 43 on the viewer's side is shown) extending rearwardly from upper rear portions of the upper frames 33, 34, and connected at their intermediate portions to the rear ends of the lower frames 31, 32.

A front portion of the upper frame 33, on one side of the vehicle, is bent downwardly at an angle to form a front frame portion 33a, which is substantially vertically oriented. A tilt angle sensor 46 and a relay 47 provided for a fuel injection system (described later) are attached to an upper portion of the front frame portion 33a. The tilt angle sensor 46 is adapted to detect a tilt angle in the left-right direction of the vehicle body frame 11.

Figure 3:
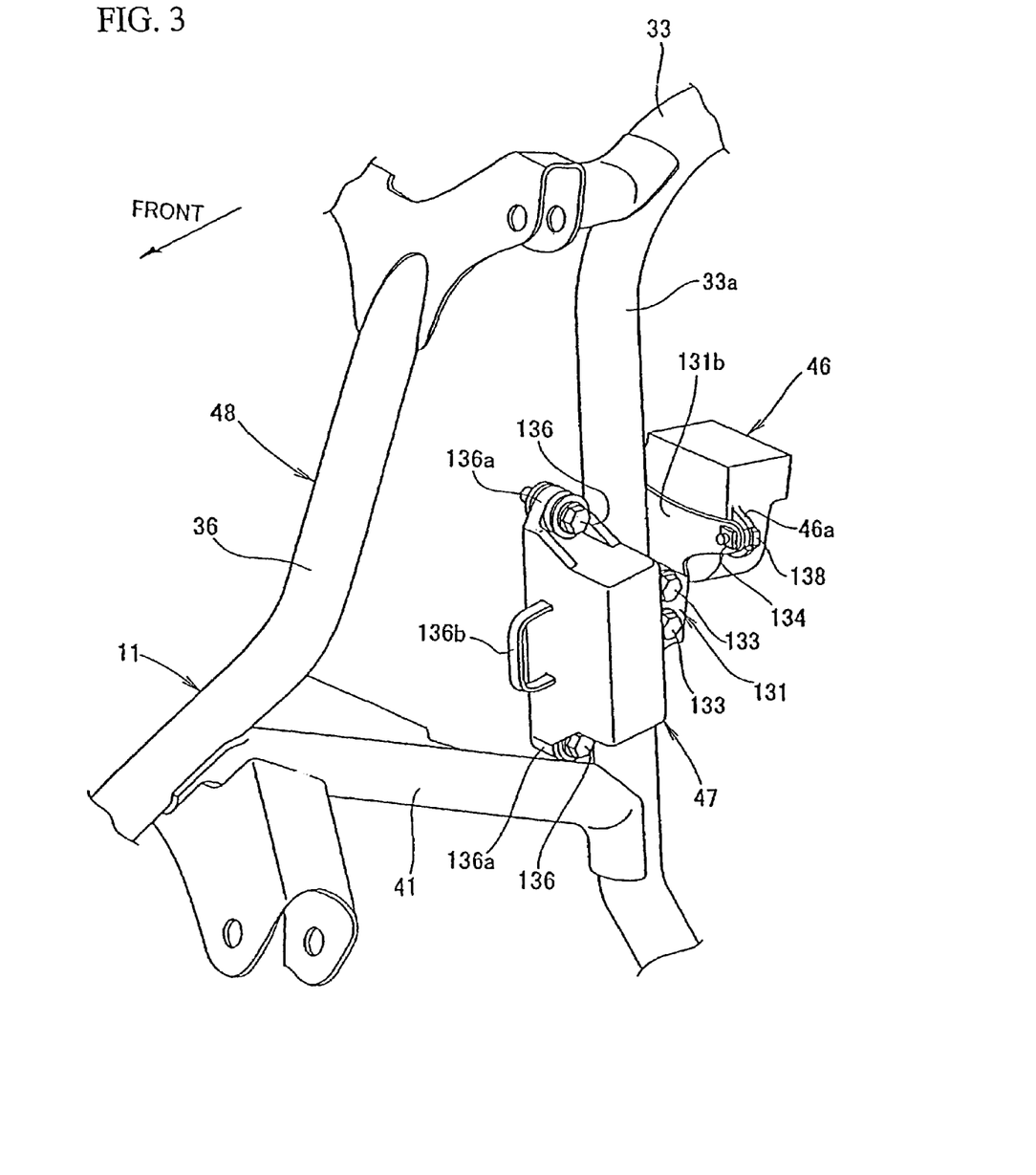
FIG. 3 is a perspective view of an isolated portion of a body frame portion of the vehicle of FIGS. 1-2, showing a tilt angle sensor and a relay pertaining to an embodiment of the present invention.

Referring now to FIG. 3 of the drawings, it will be seen that the front frame portion 33a of the upper frame 33 cooperates with the front frame 36 and the front connection frame 41 to form a closed frame loop 48, formed in a substantially triangular shape in vehicle side view. As used herein, the term "frame loop" is intended to mean a portion of the frame in which a plurality of frame sections are interconnected in a manner so as to form a substantially unbroken structure completely surrounding a defined space. The tilt angle sensor 46 is attached to the front frame portion 33a of the closed frame loop 48. In the depicted embodiment, the frame loop 48 is formed by connecting together the front frame portion 33a of the upper frame 33, the front frame 36 and the front connection frame 41, each of which constitute part of the vehicle body frame 11.

The engine 12 has a cylinder portion 51, to which an intake system 53 and an exhaust system 54 are connected. The intake system 53 includes an air cleaner 56 and a throttle body 57, while the exhaust system 54 includes an exhaust pipe 61 and a muffler 62.

The front final drive assembly 16 is a device connected to the side of left and right front wheels 68, 69 through a left-right pair of drive shafts 66, 67 (only symbol 66 on the viewer's side is shown), and provided at its rear portion with a drive switching unit 70 for making and breaking the transmission of a drive force from the front propeller shaft 17 to the front final drive assembly 16. Specifically, the drive switching unit 70 is a unit for switching the vehicle 10 between a rear-wheel-drive mode and a four-wheel-drive mode, by putting the front wheels 68, 69 into a drive mode or a non-drive mode.

The rear final drive assembly 18 is a device connected to the side of left and right rear wheels 74, 75 through a left-right pair of drive shafts 72, 73 (only symbol 72 on the viewer's side is shown).

A steering handlebar 77 for use in steering the front wheels 68, 69 is supported by a steering shaft 78. The steering shaft 78 is pivotally mounted at its upper portion on a cross pipe 111 (FIG. 2) bridgingly provided between upper portions of the left and right upper frames 33, 34. The steering shaft 78 is pivotally mounted at its lower portion on a cross plate 79 bridgingly provided between the left and right front connection frames 41, 42. The steering handlebar 77 and the steering shaft 78 are component parts of a steering mechanism 80.

The vehicle includes a radiator 81, a left-right pair of front shock absorbers 82, 83 (only symbol 82 on the viewer's side is shown), a fuel tank 84, and a fuel pump 86. The vehicle also includes a front carrier 91, a front fender 92, a body cover 93, and a seat 94, as well as a rear carrier 96, a swing arm 97 for swingably supporting the rear final drive assembly 16, a rear shock absorber unit 98 bridgingly provided between the side of the rear upper frames 43, 44 and the side of the rear final drive assembly 16, a rear fender 101, and a step floor 102.

Figure 2:
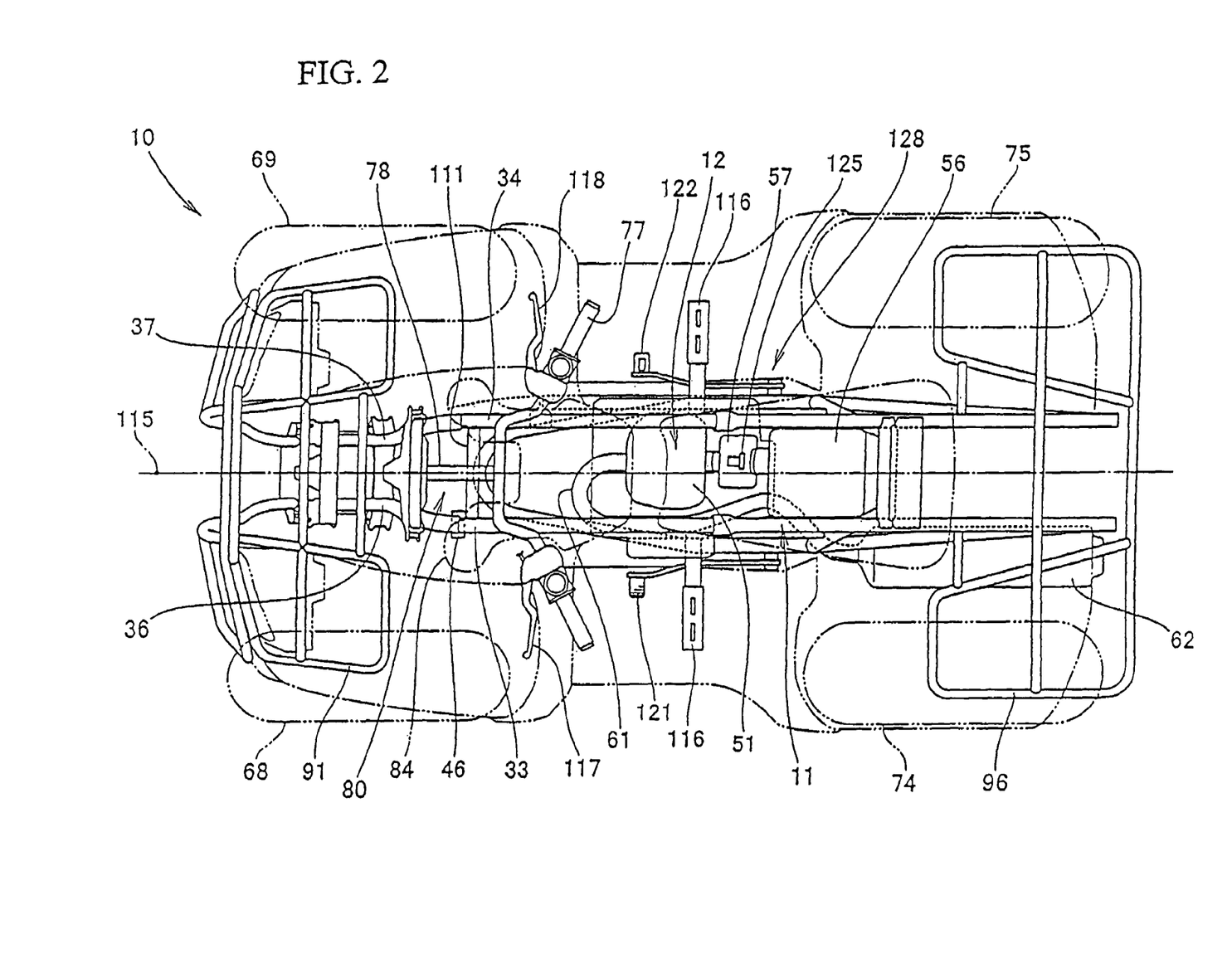
FIG. 2 is a top plan view of the vehicle of FIG. 1.

FIG. 2 is a top plan view of the vehicle of FIG. 1, in which the tilt angle sensor 46 is attached to the upper frame 33 on the vehicle left side, whereby it is disposed in the vicinity of the cross pipe 111, supporting an upper portion of the steering shaft 78. The cross pipe 111 is bridgingly mounted between the left and right upper frames 33, 34. Herein, symbol 115 denotes a vehicle body center line that extends longitudinally in the vehicle body front-rear direction, and is located at the center of the vehicle width. As seen in FIG. 2, the vehicle 10 also includes steps 116, 116, a clutch lever 117, a front wheel brake lever 118, a gear shift pedal 121, and a rear wheel brake pedal 122.

The throttle body 57 is equipped with a fuel injection valve 125, by which liquid fuel is injected into the throttle body 57. The fuel is supplied from the fuel pump 86 (see FIG. 1) connected to the fuel tank 84. The fuel injection valve 125 is controlled with respect to fuel injection amount and injection timing by an engine control unit which is not shown. The fuel pump 86, a relay (shown in FIG. 3) which will be described later, the fuel injection valve 125 and the engine control unit are component parts that constitute a fuel injection system 128.

FIG. 3 is a perspective view of an isolated portion of the vehicle frame (the arrow labeled FRONT in the figure indicates the vehicle front side, here and hereinafter) showing the tilt angle sensor and the relay 47 pertaining to the present invention in which the tilt angle sensor 46 and the relay 47 are attached to the front frame portion 33a of the upper frame 33 through an attaching bracket 131.

Since the tilt angle sensor 46 is disposed on the loop 48, the tilt angle sensor 46 can be supported by the loop 48 which is enhanced in rigidity. Moreover, since the loop 48 is restrained from vibrating, the vibration of the tilt angle sensor 46 is also suppressed.

Figure 4:
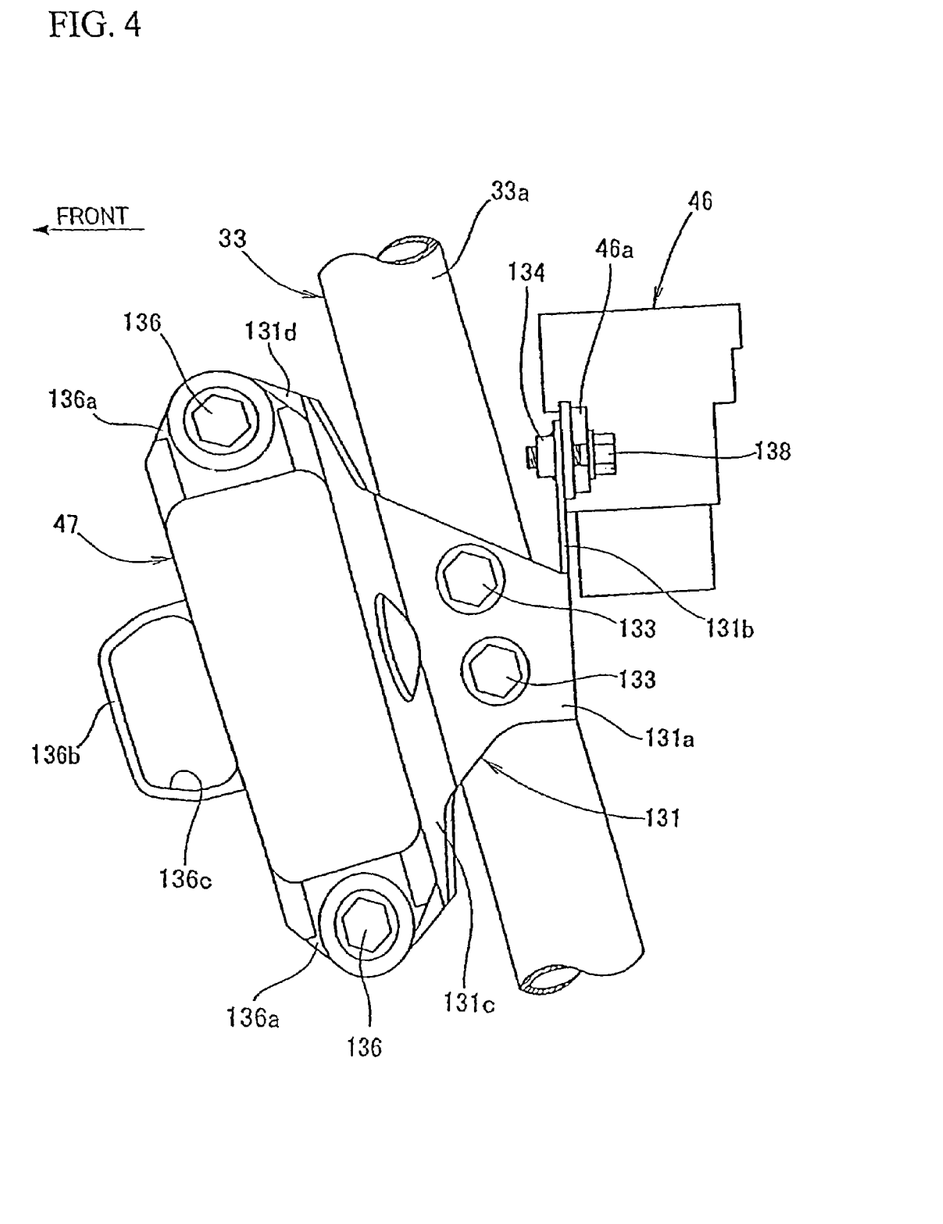
FIG. 4 is an enlarged side view of an isolated portion of the vehicle body frame showing the tilt angle sensor and the relay of FIG. 3.

FIG. 4 is a vehicle side view showing the tilt angle sensor and the relay pertaining to the present invention.

An attaching bracket 131 is a member through which the tilt angle sensor 46 and the relay 47 are attached to the front frame portion 33a in the manner of being astride the front frame portion 33a. The attaching bracket 131 includes a frame attaching portion 131a, a sensor attaching portion 131b, an inclined portion 131c, and a relay attaching portion 131d. The frame attaching portion 131a secures the attaching bracket to the front frame portion 33a of the upper frame 33 via bolts 133, 133. The sensor attaching portion 131b permits attachment of the tilt sensor 46 using nuts 134, 134 (only symbol 134 on the viewer's side is shown). The inclined portion 131c is continuous with the frame attaching portion 131a, and a relay attaching portion 131d is continuous with the inclined portion 131c, the inclined portion 131c and relay attaching portion 131d used for attachment of the relay 47 to the upper frame 33 by bolts 136, 136.

The tilt angle sensor 46 is disposed on the rear side of the front frame portion 33a, whereby the tilt angle sensor 46 can be protected by the front frame portion 33a from flying stones and the like coming from the vehicle front side.

The relay 47 is provided with stretched portions 136a, 136a for attachment to the relay attaching portion 131d by the bolts 136, 136. Incidentally, symbol 136b denotes a support portion that supports, by passing through its hole portion 136c, pipes, wires and the like connected to component parts in the periphery of the relay 47.

Figure 5:
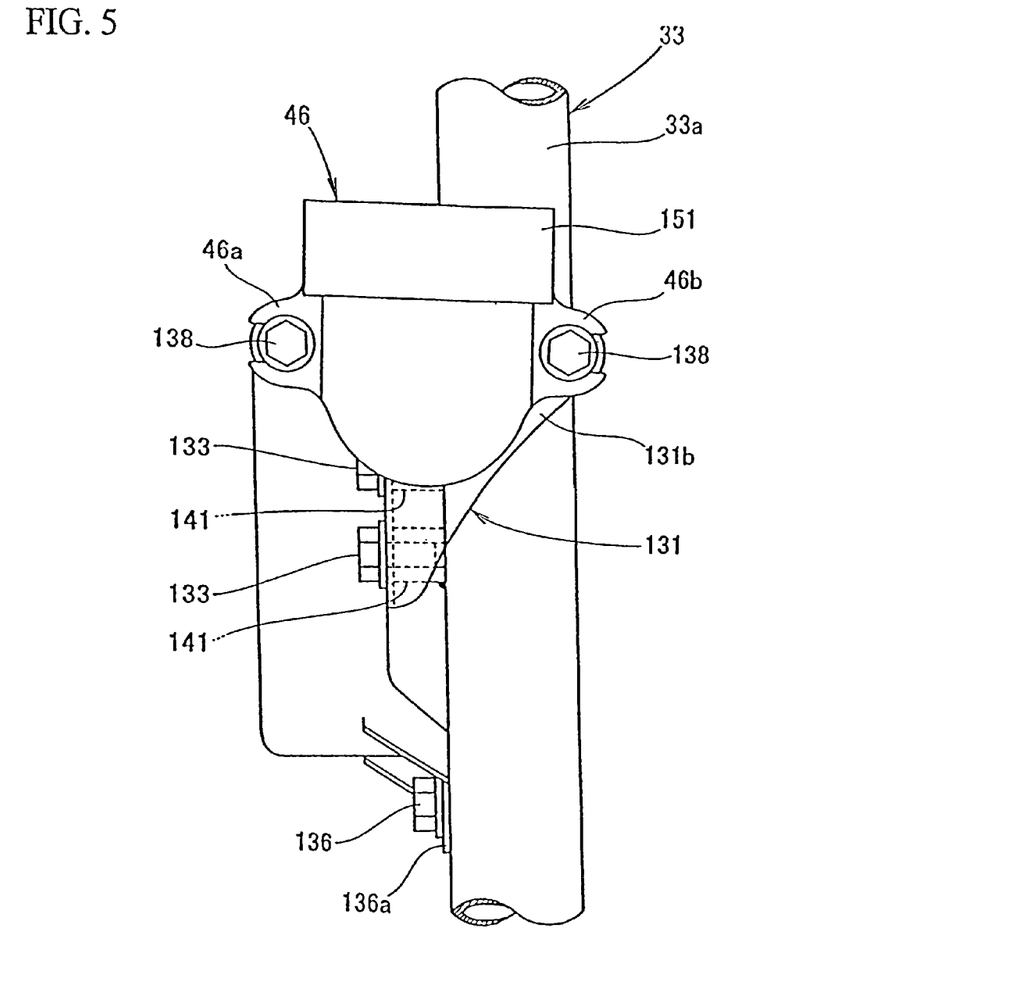
FIG. 5 is an enlarged back elevation view of an isolated portion of the vehicle body frame showing the tilt angle sensor and the relay of FIGS. 3-4.

FIG. 5 is a back elevation view of the front frame portion 33a showing the tilt angle sensor and the relay, pertaining to the present invention, attached thereto.

The tilt angle sensor 46 is provided on its lateral sides with side projecting portions 46a, 46b. The side projecting portions 46a, 46b are attached to the sensor attaching portion 131b of the attaching bracket 131 by the bolts 138, 138 and nuts 134, 134 (see FIG. 4).

Symbols 141, 141 in FIG. 4 denote boss portions attached to the front frame portion 33a. The boss portions 141, 141 are formed with female screws, and the attaching bracket 131 is attached to the boss portions 141, 141 by screwing the bolts 133, 133 into the female screws.

Figure 6A:
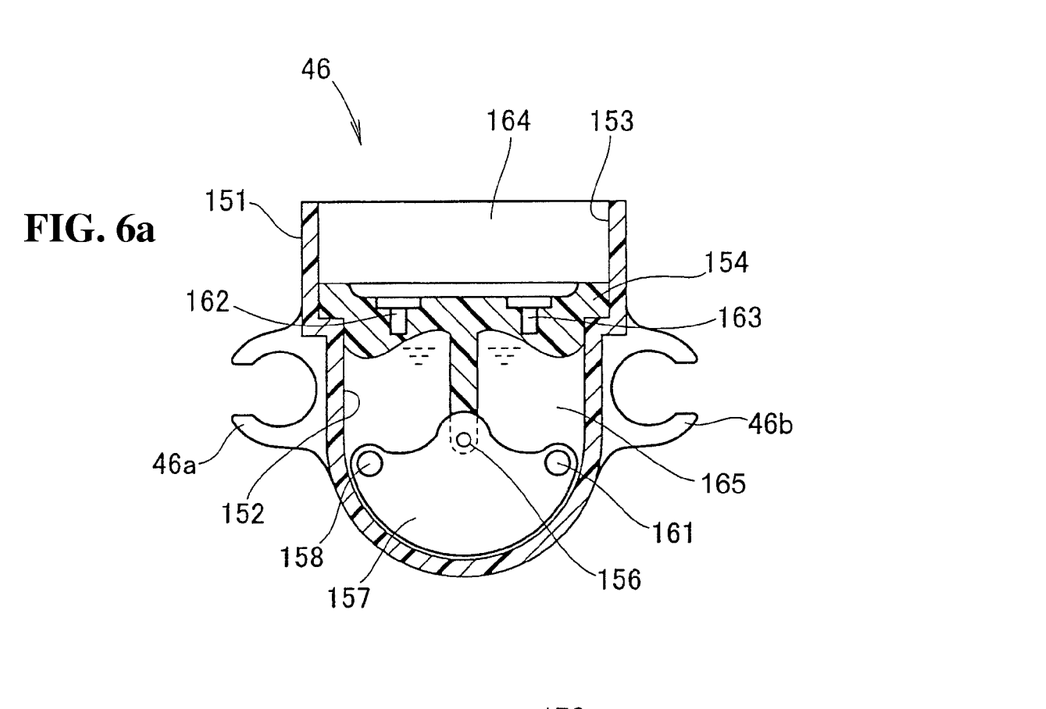
FIG. 6a is a rear sectional view of the tilt angle sensor pertaining to the illustrative embodiment of the present invention.
Figure 6B:
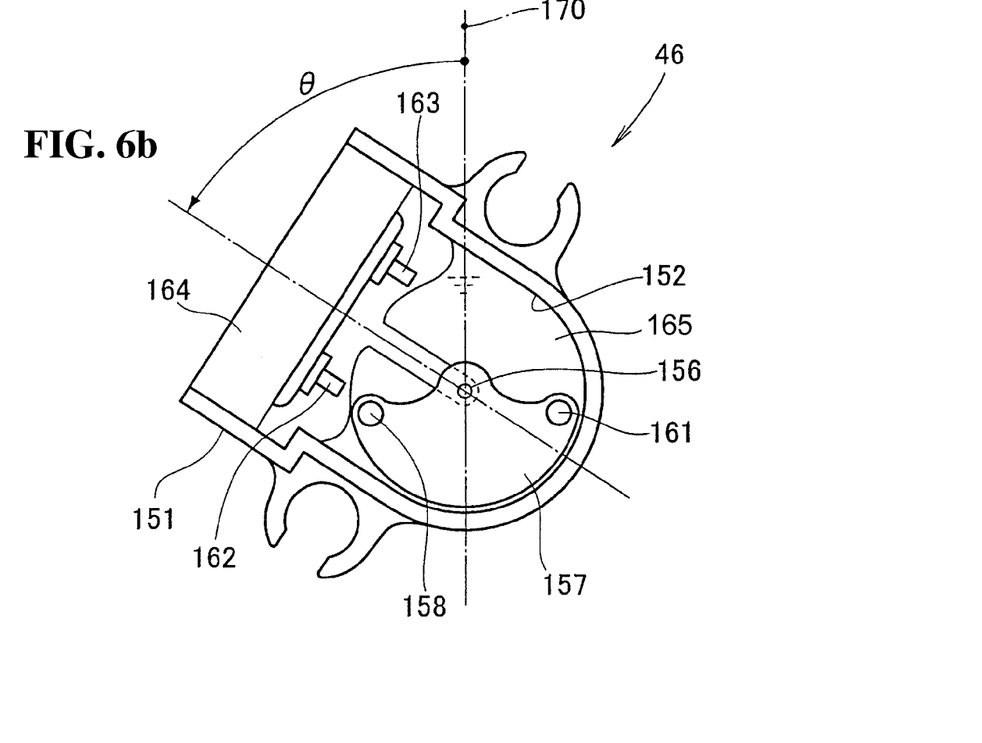
FIG. 6b is an operation diagram showing the operation of the tilt angle sensor.

FIGS. 6(a) and 6(b) are illustrations of the tilt angle sensor pertaining to the present invention.

FIG. 6(a) is a rear sectional view. The tilt angle sensor 46 includes a resin-made casing 151. A resin-made partition wall 154 partitions the interior of the casing 151 into a detection space 152 and a detection circuit containing portion 153. A weight 157 is formed in a substantially semicircular shape from a non-magnetic material and is swingably supported in the detection space 152 by a support shaft 156 attached to the partition wall 154. Magnets 158, 161 are attached to end portions of the weight 157. The detection space 152 is filled with a damper oil 165, the damper oil 165 acting to dampen the swing of the weight 157. In addition, magnetic sensors 162, 163 are provided in the partition wall 154 so as to detect the magnetism of the magnets 158, 161 when the magnets 158, 161 come into the proximity thereof, and a detection circuit 164 is connected to the magnetic sensors 162, 163 by wires and is contained in the detection circuit containing portion 153.

The weight 157 extends downwardly from the support shaft 156 as shown in FIG. 6A as a result of the force of gravity thereon unless an external force is exerted thereon, and, when the vehicle body is horizontal on the left and right sides, the distance between the magnet 158 and the magnetic sensor 162 and the distance between the magnet 161 and the magnetic sensor 163 are substantially equal.

The signals from the magnetic sensors 162, 163 are monitored by the detection circuit 164, and the detection circuit 164 outputs a signal to the engine control unit when the magnitude of the signal from the magnetic sensors 162, 163 has reached a predetermined value, such as in the case when the vehicle body is not horizontal.

Now, the operation of the tilt angle sensor 46 as above-mentioned will be described below.

FIG. 6(b) is an operation diagram showing the operation of the tilt angle sensor 46.

For example, in the case where the vehicle is inclined to the left or the right and, attendant on this, the tilt of the casing 151 of the tilt angle sensor 46 attached to the vehicle body frame has reached a predetermined angle θ relative to a vertical line 170, the magnetic sensor 162 provided on the casing 157 side comes into proximity to the magnet 158 on one side in the weight 157. As a result, the magnetic sensor 162 detects the magnetism of the magnet 158, and a detection signal generated upon the detection is sent to the detection circuit 164. In the case where the magnitude of the detection signal has reached or exceeded a predetermined value, the detection circuit 164 sends an output signal to the engine control unit. Upon receiving the output signal from the detection circuit 164 and simultaneously receiving other signals (for example, a vehicle velocity signal (a signal not more than a predetermined vehicle velocity), a throttle opening signal (a signal not more than a predetermined opening), etc.), the engine control unit stops the operations of the fuel pump and the fuel injection valve, or stops the ignition at a spark plug.

In the present invention, as shown in FIGS. 1 and 3, the tilt angle sensor 46 is laid out at the front frame portion 33a of the lower frame 33 constituting the vehicle body frame 11 so that the tilt angle sensor 46 will be minimally influenced by centrifugal forces.

The operation of this configuration will be described below.

Figure 7:
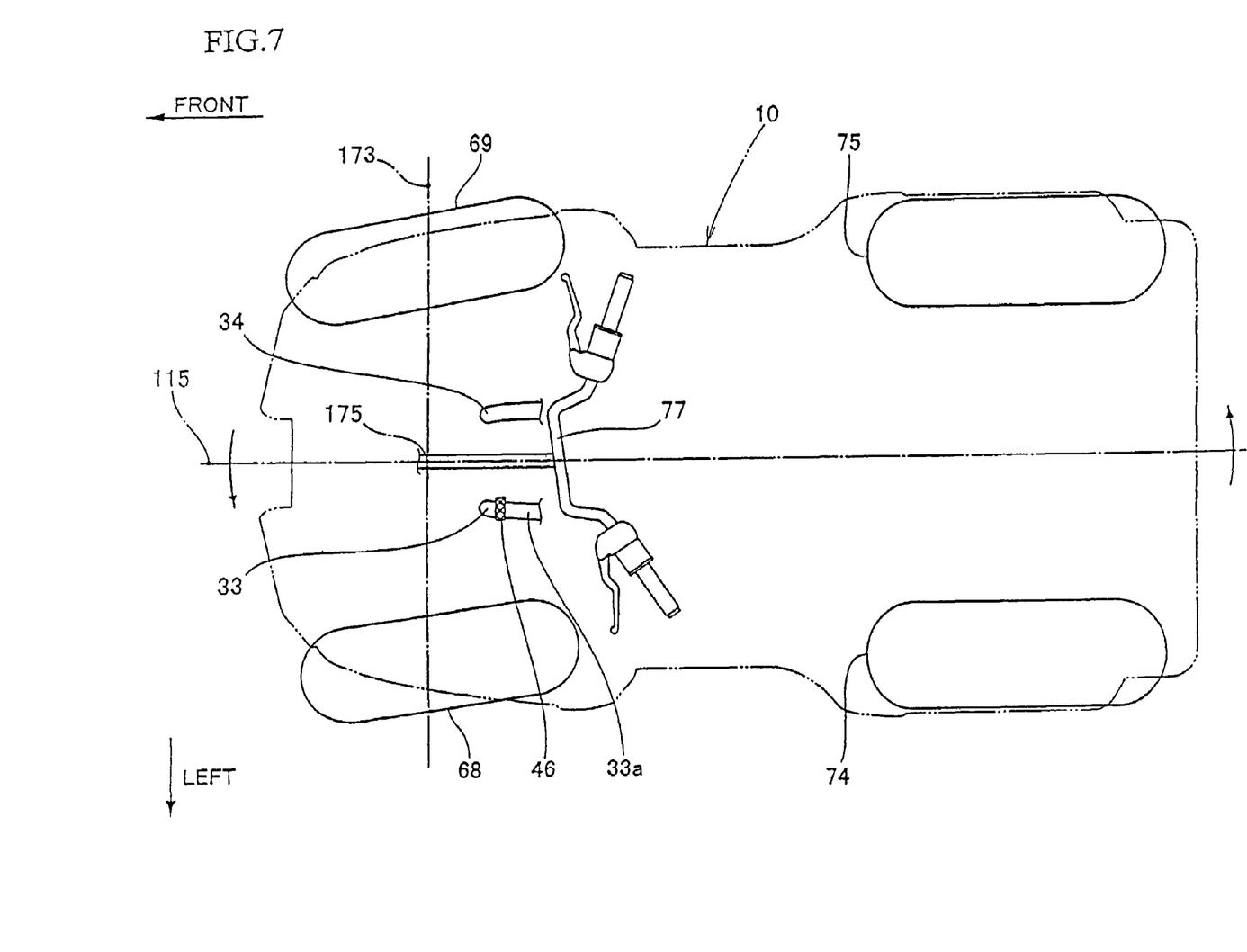
FIG. 7 is an illustration of the layout and operation of the tilt angle sensor pertaining to the present invention.

FIG. 7 is an illustration (the arrow labeled LEFT in the figure indicates the vehicle left side) of the layout and operation of the tilt angle sensor 46 pertaining to the present invention.

When the steering handlebar 77 of the vehicle 10 is turned, for example, to the left, the vehicle body of the vehicle 10 is turned to the left, about a center of turning 175 (the location represented by a solid circle) which is located on the vehicle body center line 115 and on the straight line 173 passing through the left and right front wheels 68, 69.

In the present invention, the tilt angle sensor 46 is attached to the front frame portion 33a of the lower frame 33 in the vicinity of the center of turning 175 of the vehicle body, and, therefore, the centrifugal force acting on the tilt angle sensor 46 is reduced, and the weight in the tilt angle sensor 46 is restrained from being largely swung by a centrifugal force.

As has been described referring to FIGS. 1 to 3 above, an unique character of this invention is that, in the vehicle 10 having the front wheels 68, 69 and the rear wheels 74, 75 as at least three wheels and including the engine 12, and the fuel injection system 128 for supplying the fuel from the fuel tank 84 to the engine 12, with the steering mechanism 80 including the steering handlebar 77 and the steering shaft 78 being provided at a front portion of the vehicle body, and with the tilt angle sensor 46 for detecting the tilt angle in the left-right direction of the vehicle body being attached to the vehicle body frame 11, the plurality of frame members 33, 36, 41 constituting the vehicle body frame 11 supporting the steering mechanism 80 (specifically, the steering shaft 78) is connected in the shape of a frame loop in side view, and the tilt angle sensor 46 is disposed on the loop 48.

This ensures that the tilt angle sensor 46 can be laid out in the vicinity of the center of turning of the vehicle 10, and there is no need for changing the shape or layout of component parts provided on the vehicle body. In addition, the tilt angle sensor 46 is disposed on a high rigidity portion of the vehicle body frame 11, and the influence of vibrations of the vehicle body on the tilt angle sensor 46 is reduced. Furthermore, the tilt angle sensor 46 is protected by the loop-shaped portion of the vehicle body frame, namely, the loop 48.

Another unique characteristic of this invention is that, the fuel injection system 128 includes the relay 47 for controlling the fuel supply to the engine 12 on the basis of a signal from the tilt angle sensor, and the tilt angle sensor 46 is attached to the vehicle body frame 11, specifically the front frame portion 33a of the upper frame 33, together with the relay 47. This ensures that the tilt angle sensor 46 and the relay 47 are disposed close to each other, so that the wiring for connection between the tilt angle sensor 46 and the relay 47 is shortened, and noise is reduced accordingly.

The tilt angle sensor 46 and the relay 47 are attached to the front frame portion 33a of the upper frame 33 as shown in FIG. 3 in the present embodiment. However, this configuration is not limiting; for example, configurations may be adopted in which the tilt angle sensor 46 and the relay 47 are attached to the upper frame 34 (see FIG. 2), the front frame 36 in the vicinity of the cross pipe 111 (see FIG. 2), the front frame 37 (see FIG. 2), the front connection frame 41 or the front connection frame 42 (not shown). In addition, the tilt angle sensor 46 and the relay 47 may be attached respectively to different ones of the frame members in the vicinity of the cross pipe 111.

The tilt angle sensor layout structure according to the present invention is preferable for application to three-wheel vehicles and four-wheel vehicles.

While a working example of the present invention has been described above, the present invention is not limited to the working example described above, but various design alterations may be carried out without departing from the present invention as set forth in the claims.

What is claimed is:

1. A tilt angle sensor layout structure for a vehicle, the vehicle comprising
   a vehicle body,
   a steering mechanism provided at a front portion of the vehicle body and including a handlebar and a steering shaft,
   a vehicle body frame comprising a plurality of frame members which support said steering mechanism,
   at least three wheels operatively attached to the vehicle body frame,
   a power unit having an engine supported on said vehicle body frame,
   a fuel tank supported on said vehicle body frame,
   a fuel injection system for supplying fuel from the fuel tank to said engine, and
   a tilt angle sensor operatively attached to a portion of said vehicle body frame, wherein:

the tilt angle sensor is operable to detect a tilt angle in a left-right direction of said vehicle body, the plurality of frame members cooperate to define a substantially triangular closed frame loop, the plurality of frame members comprise an upper frame member which extends from an area proximate a front one of said wheels rearwardly to an area proximate a rear one of said wheels, said upper frame member having an uppermost portion, said tilt angle sensor is disposed on said substantially triangular closed frame loop at a position below the uppermost portion of said upper frame member and spaced away from said fuel tank; and wherein the plurality of frame members of the vehicle body frame comprises:

a left-right pair of lower frames supporting a lower portion of the power unit;

a left-right pair of upper frames attached to upper portions of the lower frames so as to surround the power unit in side view, a left-right pair of front frames providing connection between front upper portions of the upper frames and front end portions of the lower frames, a left-right pair of front connection frames providing connection between the front frames and the upper frames.

2. The tilt angle sensor layout structure for a vehicle as set forth in claim 1, wherein said fuel injection system comprises a relay for controlling fuel supply to said engine on the basis of a signal from said tilt angle sensor, and said relay is operatively attached to said vehicle body frame proximate said tilt angle sensor.

3. The tilt angle sensor layout structure for a vehicle as set forth in claim 2, wherein said tilt angle sensor and said relay are attached to said vehicle body frame via a common bracket.

4. The tilt angle sensor layout structure for a vehicle as set forth in claim 1, wherein said fuel injection system comprises a relay for controlling fuel supply to said engine on the basis of a signal from said tilt angle sensor, and said tilt angle sensor and said relay are attached to one of said plurality of frame members so as to be disposed on opposed sides thereof.

5. The tilt angle sensor layout structure for a vehicle as set forth in claim 1, wherein the tilt angle sensor is attached to one of said plurality of frame members on a rearward side thereof, such that the tilt angle sensor is substantially shielded from impact with airborne debris via the frame member to which it is attached, wherein the substantially triangular closed frame loop comprises a substantially vertical frame portion, and wherein the tilt angle sensor is affixed to a rear side of said substantially vertical frame portion.

6. The tilt angle sensor layout structure for a vehicle as set forth in claim 1, wherein said tilt angle sensor comprises a sensor housing, a partition wall partitioning the sensor housing into plural chambers, a weighted member pivotally extending from said partition wall, the partition wall comprising at least one sensing body for detecting a proximity of the weighted member with respect to the partition wall, wherein the tilt angle sensor outputs a signal when said sensing body detects proximity of the weighted member within a predetermined proximity range.

7. The tilt angle sensor layout structure for a vehicle as set forth in claim 1, wherein a shape of said fuel tank is independent of a shape of the tilt angle sensor.

8. In a vehicle of the type comprising a vehicle body, a steering mechanism provided at a front portion of the vehicle body and including a handlebar and a steering shaft, a vehicle body frame comprising a plurality of frame members which support said steering mechanism, at least three wheels operatively attached to the vehicle body frame, an engine supported on said vehicle body frame, a fuel tank supported on said vehicle body frame, and a fuel injection system for supplying fuel from the fuel tank to said engine, the improvement comprising a tilt angle sensor layout structure, in which:

the plurality of frame members comprise an upper frame member which extends from an area proximate a front one of said wheels rearwardly to an area proximate a rear one of said wheels, said upper frame member having an uppermost portion, a tilt angle sensor is operatively attached to a portion of said vehicle body frame, said tilt angle sensor being operable to detect a tilt angle in a left-right direction of said vehicle body, wherein said tilt angle sensor is disposed on said a substantially triangular closed frame loop at a position situated below the uppermost portion of said upper frame member and spaced away from said fuel tank.

9. The vehicle as set forth in claim 8, wherein said fuel injection system comprises a relay for controlling fuel supply to said engine on the basis of a signal from said tilt angle sensor, and wherein said relay is attached to said vehicle body frame proximate said tilt angle sensor.

10. The vehicle as set forth in claim 8, wherein said fuel injection system comprises a relay for controlling fuel supply to said engine, wherein the relay operates based on a signal from said tilt angle sensor, and wherein said tilt angle sensor and said relay are attached to said vehicle body frame via a common bracket.

11. The vehicle as set forth in claim 8, wherein said fuel injection system comprises a relay for controlling fuel supply to said engine on the basis of a signal from said tilt angle sensor, and wherein said tilt angle sensor and said relay are attached to one of said plurality of frame members so as to be disposed on opposed sides thereof.

12. The vehicle as set forth in claim 8, wherein the tilt angle sensor is attached to one of said plurality of frame members on a rearward side thereof, such that the tilt angle sensor is substantially shielded from impact with airborne debris via the frame member to which it is attached.

13. The vehicle as set forth in claim 8, wherein said tilt angle sensor comprises a sensor housing, a partition wall partitioning the sensor housing into plural chambers, a weighted member pivotally extending from said partition wall, the partition wall comprising at least one sensing body for detecting a proximity of the weighted member with respect to the partition wall, wherein the tilt angle sensor outputs a signal when said sensing body detects proximity of the weighted member within a predetermined proximity range.

14. The vehicle as set forth in claim 8, wherein a shape of said fuel tank is independent of a shape of the tilt angle sensor.

15. An all-terrain vehicle, comprising:
    a vehicle body,
    a steering mechanism provided at a front portion of the vehicle body and including a handlebar and a steering shaft,
    a vehicle body frame comprising a plurality of frame members which support said steering mechanism,
    at least three wheels operatively attached to the vehicle body frame,
    an engine supported on said vehicle body frame,
    a fuel tank supported on said vehicle body frame,
    a fuel injection system for supplying fuel from the fuel tank to said engine, and
    a tilt angle sensor operatively attached to a portion of said vehicle body frame, wherein:
    the plurality of frame members comprise an upper frame member which extends from an area proximate a front one of said wheels rearwardly to an area proximate a rear one of said wheels, said upper frame member having an uppermost portion,
    the tilt angle sensor is operable to detect a tilt angle in a left-right direction of said vehicle body,
    the plurality of frame members cooperate to define a substantially triangular closed frame loop, and said tilt angle sensor is disposed on said substantially triangular closed frame loop at a position situated below the uppermost portion of said upper frame member, and spaced away from said fuel tank.

16. The vehicle as set forth in claim 15, wherein said fuel injection system comprises a relay for controlling fuel supply to said engine on the basis of a signal from said tilt angle sensor, and wherein said relay is operatively attached to said vehicle body frame proximate said tilt angle sensor.

17. The vehicle as set forth in claim 16, wherein said tilt angle sensor and said relay are attached to said vehicle body frame via a common bracket.

18. The vehicle as set forth in claim 15, wherein:
    said fuel injection system comprises a relay for controlling fuel supply to said engine on the basis of a signal from said tilt angle sensor, and
    said tilt angle sensor and said relay are attached to one of said plurality of frame members so as to be disposed on opposed sides thereof.

19. The vehicle as set forth in claim 15, wherein the tilt angle sensor is attached to one of said plurality of frame members on a rearward side thereof, such that the tilt angle sensor is substantially shielded from impact with airborne debris via the frame member to which it is attached.

20. The vehicle as set forth in claim 15, wherein said tilt angle sensor comprises
    a sensor housing,
    a partition wall partitioning the sensor housing into plural chambers,
    a weighted member pivotally extending from said partition wall,
    the partition wall comprising at least one sensing body for detecting a proximity of the weighted member with respect to the partition wall,
    wherein the tilt angle sensor outputs a signal when said sensing body detects proximity of the weighted member within a predetermined proximity range.

\* \* \* \* \*